US009590900B2

(12) United States Patent
Rajah et al.

(10) Patent No.: US 9,590,900 B2
(45) Date of Patent: Mar. 7, 2017

(54) PROTOCOL FOR SUPPORTING GATEWAYS WITH REDUNDANT ROUTERS IN A SHARED DOMAIN

(75) Inventors: Rajesh Amaresh Rajah, Morrisville, NC (US); Amit Surendra Singh, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 13/569,791

(22) Filed: Aug. 8, 2012

(65) Prior Publication Data

US 2014/0047098 A1 Feb. 13, 2014

(51) Int. Cl.
*H04L 12/713* (2013.01)
*H04L 12/64* (2006.01)

(52) U.S. Cl.
CPC ........ *H04L 45/586* (2013.01); *H04L 12/6418* (2013.01)

(58) Field of Classification Search
None
See application file for complete search history.

(56) References Cited

U.S. PATENT DOCUMENTS

| | | | | |
|---|---|---|---|---|
| 6,397,260 | B1* | 5/2002 | Wils et al. | 709/238 |
| 7,227,838 | B1* | 6/2007 | O'Riordan | 370/219 |
| 7,486,610 | B1* | 2/2009 | Bhupalam et al. | 370/216 |
| 7,567,505 | B2* | 7/2009 | Iijima et al. | 370/216 |
| 7,716,366 | B2* | 5/2010 | Regan et al. | 709/240 |
| 7,796,593 | B1* | 9/2010 | Ghosh | H04L 12/4633 370/389 |
| 7,881,208 | B1* | 2/2011 | Nosella et al. | 370/242 |
| 8,576,844 | B1* | 11/2013 | Ghosh | H04L 12/462 370/390 |
| 2003/0142679 | A1* | 7/2003 | Okagawa et al. | 370/397 |
| 2004/0215821 | A1* | 10/2004 | Regan et al. | 709/240 |
| 2005/0044262 | A1* | 2/2005 | Luo | H04L 12/4641 709/238 |
| 2007/0091804 | A1* | 4/2007 | Pan et al. | 370/230 |
| 2007/0127370 | A1* | 6/2007 | Chang et al. | 370/229 |
| 2008/0005782 | A1* | 1/2008 | Aziz | 726/3 |

(Continued)

OTHER PUBLICATIONS

Cisco: What is VRRP?, Document ID: 7210, Feb. 2006.

(Continued)

*Primary Examiner* — Scott B Christensen
*Assistant Examiner* — Sean Concannon
(74) *Attorney, Agent, or Firm* — Patterson + Sheridan, LLP

(57) ABSTRACT

In an example embodiment, an apparatus with a first interface coupled to a local domain with routers that employ a redundant router protocol, such as Hot Standby Router Protocol (HSRP) and/or Virtual Router Redundancy Protocol (VRRP), and a second interface coupled with a shared domain, such as Virtual Private LAN (Local Area Network) Service (VPLS), and virtual bridging logic coupled with the first and second interfaces. The virtual bridging logic performs packet snooping, filtering and/or provides a proxy service so that the routers employing the redundant router protocol are localized in the local domain, and avoids the routers employing the redundant router protocol from associating with other routers employing the redundant routing protocol that are in another local domain coupled with the shared domain.

20 Claims, 3 Drawing Sheets

(56) References Cited

U.S. PATENT DOCUMENTS

| | | | | |
|---|---|---|---|---|
| 2010/0284290 A1* | 11/2010 | Williams | .......... | H04W 28/0263 |
| | | | | 370/252 |
| 2011/0141881 A1* | 6/2011 | Joshi et al. | .................... | 370/219 |
| 2011/0162060 A1* | 6/2011 | Vijayakumar et al. | ......... | 726/13 |
| 2011/0312283 A1* | 12/2011 | Rodbro et al. | .................. | 455/68 |
| 2012/0147882 A1* | 6/2012 | Balus | ..................... | H04L 47/20 |
| | | | | 370/389 |
| 2012/0257623 A1* | 10/2012 | Huang | .................... | H04L 12/56 |
| | | | | 370/390 |

OTHER PUBLICATIONS

Alcatel-Lucent: VPLS Technical Tutorial, Technology White Paper, 2009.
T. Li et al., Cisco Hot Standby Router Protocol (HSRP), Mar. 1998.
Cisco: Virtual Router Redundancy Protocol.

* cited by examiner

PROTOCOL FOR SUPPORTING GATEWAYS WITH REDUNDANT ROUTERS IN A SHARED DOMAIN

TECHNICAL FIELD

The present disclosure relates generally to supporting gateways with redundant routers coupled with a shared domain.

BACKGROUND

Globalization, business process optimization, and the need for continuous computing operations motivate business to seek solutions that can both distribute and unite data centers over geographically dispersed locations. Geographically distributed data centers are desirable for mutual backup to reduce interruptions from local disasters and also to facilitate data center maintenance.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
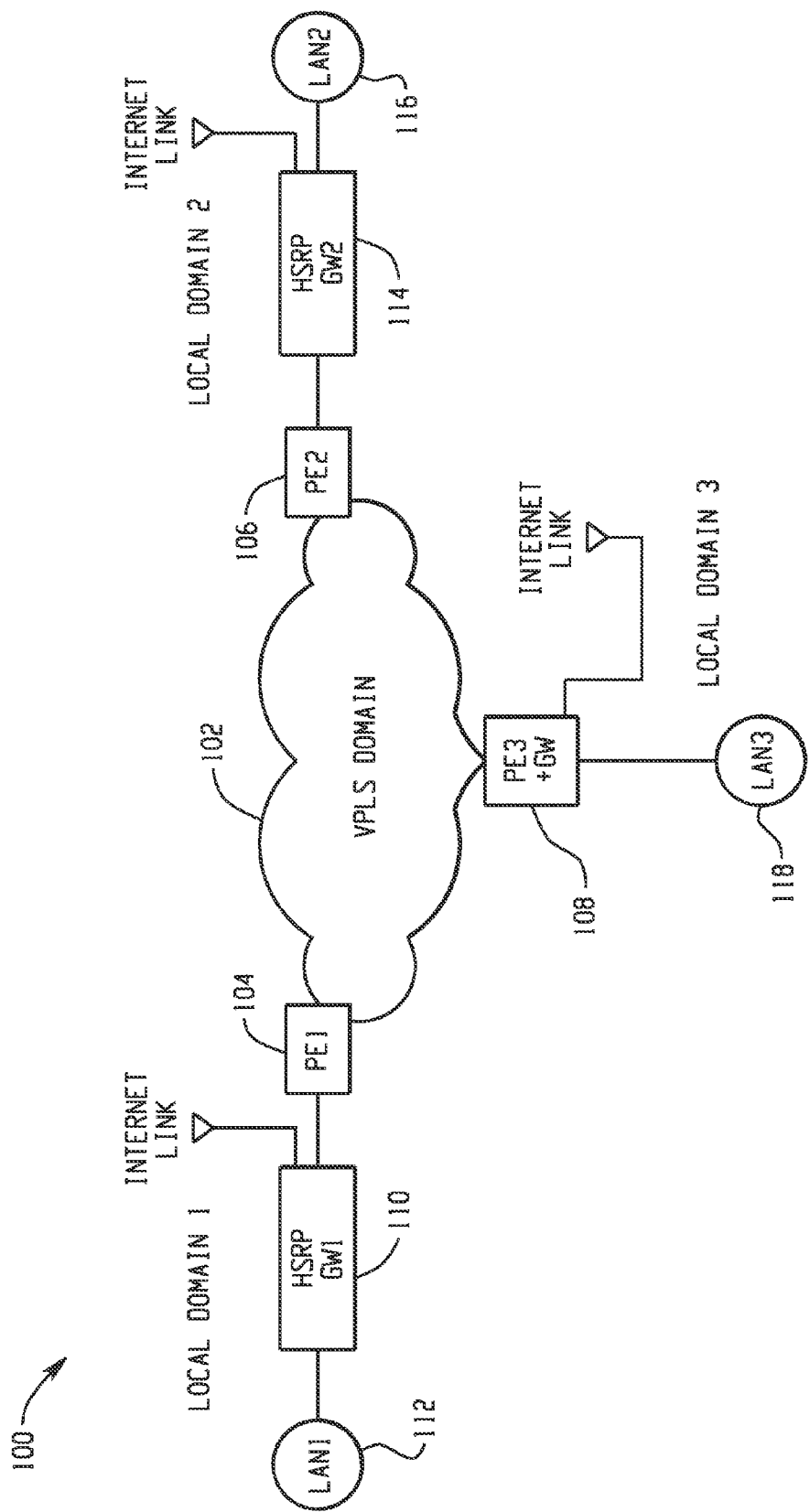
FIG. 1 illustrates an example of a network of a shared domain with gateways that have redundant routers.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus with a first interface coupled to a local domain with routers that employ a redundant router protocol such as Hot Standby Router Protocol (HSRP) and/or Virtual Router Redundancy Protocol (VRRP), and a second interface coupled with a shared domain such as Virtual Private LAN (Local Area Network) Service (VPLS), and virtual bridging logic coupled with the first and second interfaces. The virtual bridging logic performs packet snooping, filtering and/or provides a proxy service so that the routers employing the redundant router protocol are localized in the local domain, and avoids the routers employing the redundant router protocol from associating with other routers employing the redundant routing protocol that are in another local domain coupled with the shared domain.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 illustrates an example of a network 100 of a shared domain 102 coupled with gateways 110, 114 that employ redundant routers. For purposes of illustration, the shared domain 102 in the illustrated example is a Virtual private LAN (Local Area Network) service (VPLS) network (or VPLS domain), however those skilled in the art should readily appreciate that the principles described herein are applicable with other types of shared domains. VPLS provides Ethernet based multipoint to multipoint communication over IP/MPLS (Internet Protocol/Multiprotocol Label Switching) networks. VPLS allows geographically dispersed sites to share an Ethernet broadcast domain by connecting sites through pseudo-wires (PWs). A Provider Edge (PE) (e.g., PE's 104, 106, 108) is where the VPLS originates and terminates. The PE sets up the appropriate communications, such as tunnels, to communicate with other PEs coupled with the VPLS. For example, the example illustrated in FIG. 1 has three PEs, a first PE (PE1) 104, a second PE (PE2) 106, and a third PE (PE3) 108. As those skilled in the art should readily appreciate, a VPLS network may employ any physically realizable number of PEs, and that the number of PEs selected in FIG. 1 where selected merely for ease of illustration. Those skilled in the art should also readily appreciate that the PEs may be geographically dispersed from each other. For example, PE1 104 may be located in a data center in San Jose, Calif., PE2 106 may be located in a data center in Cleveland, Ohio, and PE3 108 may be located in a data center in Atlanta, Ga.

In the illustrated example, the first PE (PE1) 104 couples the VPLS domain 102 with a first local domain (Local Domain 1) that comprises a gateway ("HSRP GW1") 110 that comprises redundant routers employing a redundant routing protocol (HSRP in this example, although the principles described herein are also applicable to other redundant routing protocols such as VRRP). By redundant routers is meant a gateway that employs multiple routers for routing packets. A protocol associated with the redundant routers controls the operation of the redundant routers. For example, Hot Standby Routing Protocol (HSRP) is a standard, defined in RFC 2281 (March 1998), that calls for a mirrored router in passive mode to send hello packets, wait for a lead router to die and, without dropping a packet, take over from that router. Virtual Router Redundancy Protocol (VRRP) is a protocol defined in RFC 3768 (April 2004) for switching to a backup router in the case of failure. Two or more routers are set up with VRRP, and one is elected the "master." The master router continuously sends advertisement packets to the backups, and if the advertisements stop, one of the backup routers becomes the master. All routers share a "virtual IP" address, so they are all seen as one address.

VRRP can also be used for load sharing. As those skilled in the art can readily appreciate, the principles described herein are not specific to any one or more redundant router protocols, such as HSRP and/or VRRP, but can be employed with any suitable redundant router protocol.

The HSRP GW1 110 is coupled to a first LAN, (LAN1) 112. The second PE 106 coupled the VPLS domain 102 with a second local domain (Local Domain 2) that comprises a gateway (HSRP GW2) 114 that also comprises redundant routers. The HSRP GW2 114 is coupled with a second LAN (LAN2) 116. The third PE 108 coupled the VPLS domain 102 with a third local domain (Local Domain 3) that comprises a third LAN (LAN3) 118. In the illustrated example, the third LAN 118 does not employ redundant routers that use a protocol such as HSRP or VRRP. In addition, the third PE 108 also functions as the gateway for the third LAN 118, illustrating that in accordance with an example embodiment, gateways and PEs may also be implemented by a single device and/or multiple devices.

In an example embodiment, because the first PE 104 and the second PE 106 are coupled with gateways having routers that employ a redundant routing protocol, the first PE 104 and the second PE 106 may restrict certain packets from the VPLS (shared) domain 102. For example, packets that may be restricted from the VPLS (shared) domain 102 include but are not limited to predefined HSRP packets, predefined VRRP packets, GLBP ("Gateway Load Balancing Protocol"—a proprietary protocol available from Cisco Systems, Inc., 170 West Tasman Dr., San Jose, Calif. 95134) packets, and ARP (Address Resolution Protocol) packets.

In an example embodiment, the PEs 104, 106, 108 snoop packets received from the VPLS domain 102 to determine whether there are other local domains coupled with the VPLS domain 102 that are employing the redundant routing protocol (HSRP in this example).

In an example embodiment, the first PE 104 and the second PE 106 filter predefined (e.g., HSRP) packets sent by routers coupled with the HSRP GW1 110 and the HRSP GW2 114 respectively addressed to the VPLS domain 102. For example, HSRP Coup and/or Resign message types may be filtered and blocked from entering the VPLS (shared) domain 102.

In an example embodiment, the first PE 104 and the second PE 106 provide a proxy service for the routers employing the HSRP (redundant routing protocol, e.g., the HRSP GW1 110 and the HSRP GW2 114 respectively). For example, the proxy service may suitably comprise snooping a packet employed by the HSRP protocol and changing the priority level to a lower level (e.g., the lowest priority level) before forwarding the packet onto the VPLS domain 102.

In an example embodiment, the first PE 104 and the second PE 106 may also snoop and/or filter HSRP packets received from the VPLS domain 102. For example, to prevent a router on another local domain from becoming the primary router in a local domain, the priority level of routers for packets received from the VPLS domain 102 may be changed to the lowest level.

In the illustrated example, the VPLS domain 102 is associated with a virtual Media Access Control (MAC) address. The first PE 104 and the second PE 106 can filter or proxy packets received from the local domains (e.g., local domain 1 and local domain 2 respectively) that are addressed to the virtual MAC address.

An aspect of an example embodiment is that a router associated with one local domain employing redundant routing protocol can be prevented from becoming the default router for another local domain employing the redundant routing protocol. For example, if a router at HSRP GW2 114 became the active router for both the HSRP GW1 110 and the HSRP GW2 114, then traffic from a devices associated with the LAN1 112 would be routed across the VPLS domain 102 to the HRSP GW2 114 for forwarding. For example, if the LAN1 112 is located in the United States and the LAN 2 116 is located in Europe, if a router on the HSRP GW2 114 becomes the active router for the Local Domain 1, then traffic from a device associated with the LAN 1 112 (in the United States) would be routed across the VPLS domain 102 to the HRSP GW2 114 (in Europe) for forwarding, which could result in delay and unnecessary consumption of bandwidth on the VPLS domain 102. Thus, because the example embodiments described herein localize (or isolate) routers employing a redundant routing protocol on different domains, the example embodiments described herein can be said to support an Active/Active gateway scenario.

Figure 2:
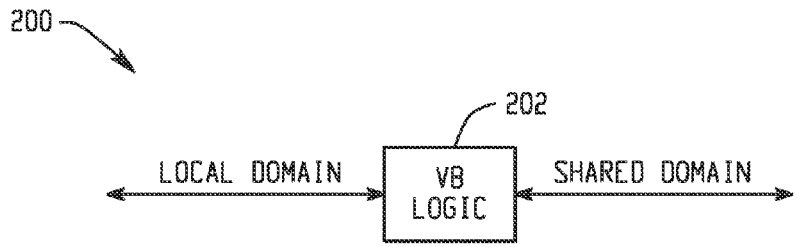
FIG. 2 illustrates an example of an apparatus for supporting redundant routers in a shared domain.

FIG. 2 illustrates an example of an apparatus 200 for supporting redundant routers in a shared domain. The apparatus 100 is suitable for implementing the functionality of the first PE 104, the second PE 106, and the third PE 108 described herein in FIG. 1.

The Apparatus 200 comprises virtual bridging (VB) logic 202 for coupling a local domain with a shared domain. "Logic", as used herein, includes but is not limited to hardware, firmware, software stored in a non-transient medium, and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, a non-transient memory device containing instructions, or the like, or combinational logic embodied in hardware. Logic may also be fully embodied as software stored on a non-transitory, tangible medium which performs a described function when executed by a processor. Logic may suitably comprise one or more modules stored on a non-transitory tangible medium configured to perform one or more functions.

In an example embodiment, the shared domain is a logically shared domain. For example, the shared domain may be a VPLS domain.

In an example embodiment, a gateway comprising redundant routers employing a redundant routing protocol are coupled with the local domain. The redundant routing protocol may be any suitable protocol, such as HSRP and/or VRRP.

In an example embodiment, the virtual bridging logic 202 is operable to snoop packets received from the shared domain. The virtual bridging logic 202 may snoop the packets received from the shared domain to determine whether another (e.g., second) local domain that is coupled with the shared domain is employing the redundant routing protocol. In particular embodiments, the virtual bridging logic 202 may filter redundant routing protocol packets received from the shared domain and/or modify the packets, such as for example, changing the priority level of redundant routing protocol packets received from the shared domain.

In an example embodiment, the virtual bridging logic 202 filters redundant routing protocol packets received on the local domain that are addressed to the shared domain. For example, if the shared domain is a logically shared domain such as a VPLS domain identified by a virtual MAC address, packets received on the local interface addressed to the virtual MAC address are filtered.

In an example embodiment, the virtual bridging logic 202 is operable to provide a proxy service for the routers employing the redundant routing protocol coupled with the local domain. The proxy service may suitably comprise snooping a packet employed by the redundant routing protocol, the packet having a priority level. The virtual bridging logic 202 changes the priority level to a lower (e.g. the lowest) priority level before routing the packet onto the shared domain. In particular embodiments, the proxy service may also be employed to change the priority level of packets received from the shared domain before forwarding onto the local domain.

Figure 3:
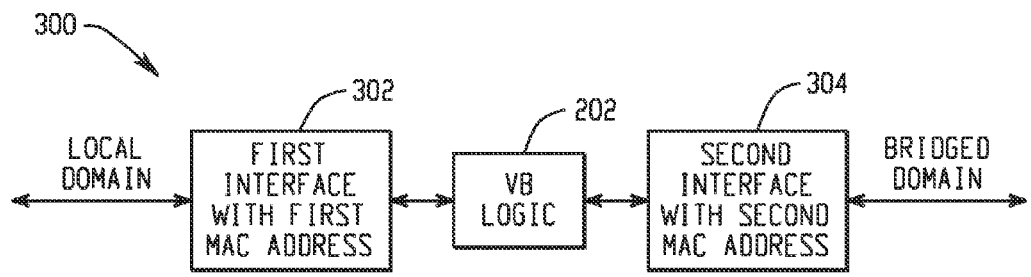
FIG. 3 illustrates an example of an apparatus for supporting redundant routers in a shared domain with an interface for communicating with a local domain and an interface for communicating with a shared domain.

FIG. 3 illustrates an example of an apparatus 300 for supporting redundant routers in a shared domain. For example, the apparatus 300 is suitable for implementing the functionality of the first PE 104, the second PE 106, and the third PE 108 described herein in FIG. 1. The apparatus 300 comprises virtual bridging logic 202 that employs a first interface 302 to communicate with the local domain and a second interface 304 to communicate with the shared domain.

In an example embodiment, the shared domain is a logically shared domain. For example, the shared domain may be a VPLS domain.

In an example embodiment, a gateway comprising redundant routers employing a redundant routing protocol are coupled with the local domain. The redundant routing protocol may be any suitable protocol such as HSRP and/or VRRP.

In an example embodiment, the virtual bridging logic 202 is operable to snoop packets received from the shared domain via the second interface 304. The virtual bridging logic 202 may snoop the packets received from the shared domain to determine whether another (e.g., second) local domain that is coupled with the shared domain is employing the redundant routing protocol. In particular embodiments, the virtual bridging logic 202 may filter redundant routing protocol packets received from the shared domain and/or modify the packets, such as for example, changing the priority level of redundant routing protocol packets received from the shared domain.

In an example embodiment, the virtual bridging logic 202 filters redundant routing protocol packets received from the local domain on the first interface 302 that are addressed to the shared domain. For example, if the shared domain is a logically shared domain such as a VPLS domain identified by a virtual MAC address, packets received on the local interface addressed to the virtual MAC address are filtered.

In an example embodiment, the virtual bridging logic 202 is operable to provide a proxy service for the routers employing the redundant routing protocol coupled with the local domain coupled with the first interface 302. The proxy service may suitably comprise snooping a packet employed by the redundant routing protocol, the packet having a priority level. The virtual bridging logic 202 changes the priority level to a lower (e.g., the lowest) priority level before routing the packet onto the shared domain via the second interface 304. In particular embodiments, the proxy service may also be employed to change the priority level of packets received from the shared domain before forwarding onto the local domain.

Figure 4:
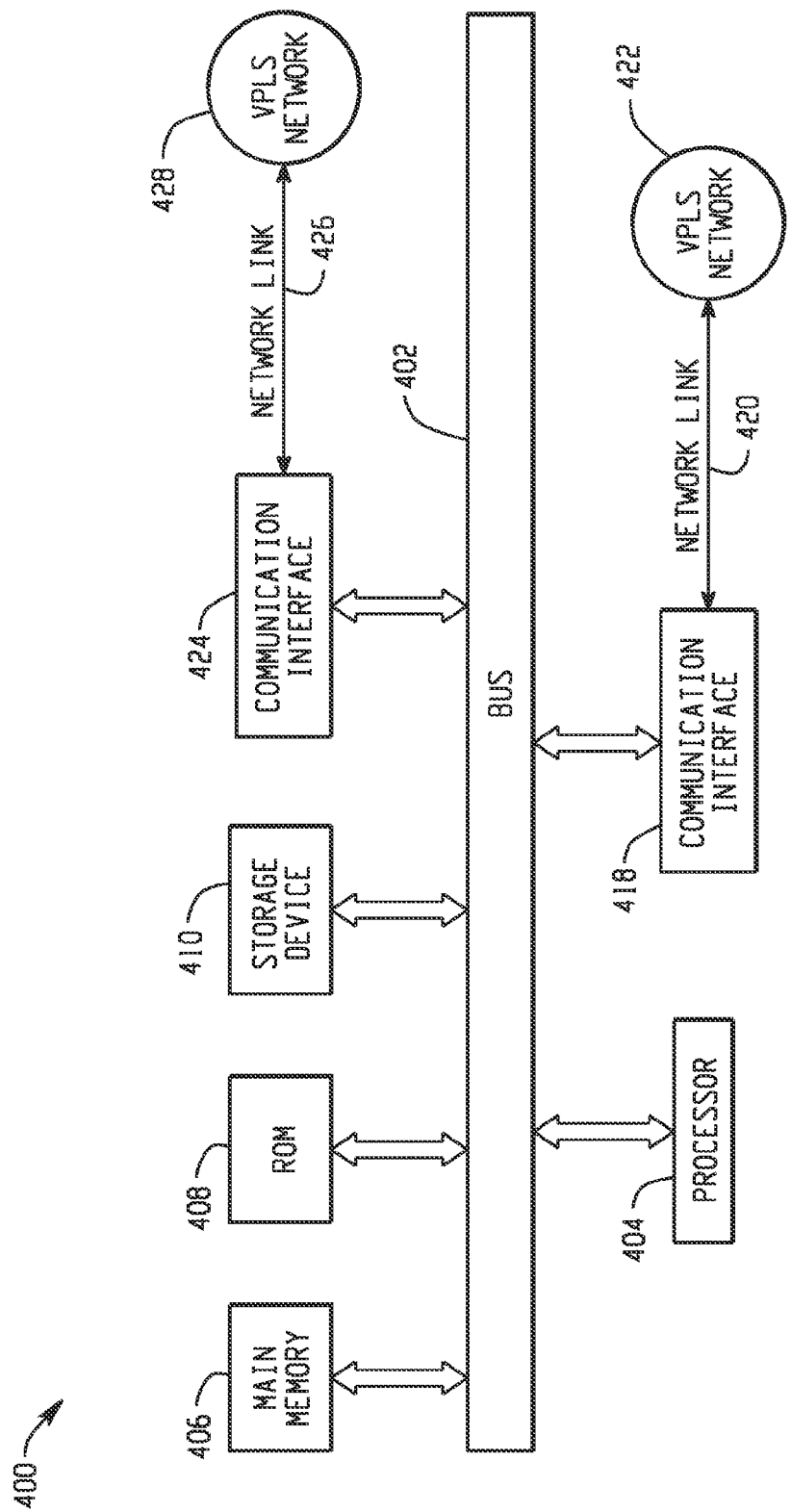
FIG. 4 is a block diagram that illustrates a computer system upon which an example embodiment may be implemented.

FIG. 4 is a block diagram that illustrates a computer system 400 upon which an example embodiment may be implemented. The computer system 400 includes a bus 402 or other communication mechanism for communicating information and a processor 404 coupled with the bus 402 for processing information. The computer system 400 also includes a main memory 406, such as random access memory (RAM) or other dynamic storage device coupled to the bus 402 for storing information and instructions to be executed by the processor 404. The main memory 406 also may be used for storing a temporary variable or other intermediate information during execution of instructions to be executed by the processor 404. The computer system 400 further includes a read only memory (ROM) 408 or other static storage device coupled to the bus 402 for storing static information and instructions for the processor 404. A storage device 410, such as a magnetic disk, optical disk, and/or flash storage, is provided and coupled to the bus 402 for storing information and instructions.

An aspect of the example embodiment is related to the use of the computer system 400 for implementing a protocol for supporting gateways with redundant routers coupled with a shared domain. According to an example embodiment, implementing a protocol for supporting gateways with redundant routers coupled with a shared domain is provided by the computer system 400 in response to the processor 404 executing one or more sequences of one or more instructions contained in the main memory 406. Such instructions may be read into the main memory 406 from another computer-readable medium, such as the storage device 410. Execution of the sequence of instructions contained in the main memory 406 causes the processor 404 to perform the process steps described herein. One or more processors in a multi-processing arrangement may also be employed to execute the sequences of instructions contained in the main memory 406. In alternative embodiments, hard-wired circuitry may be used in place of or in combination with software instructions to implement an example embodiment. Thus, the example embodiments described herein are not limited to any specific combination of hardware circuitry and software.

The term "computer-readable medium" as used herein refers to any medium that participates in providing instructions to the processor 404 for execution. Such a medium may take many forms, including but not limited to non-volatile media, and volatile media. Non-volatile media include, for example, optical or magnetic disks, such as storage device 410. Volatile media include dynamic memory such as main memory 406. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to the processor 404 for execution. For example, the instructions may initially be borne on a magnetic disk of a remote computer. The remote computer can load the instructions into its dynamic memory and send the instructions over a telephone line using a modem. A modem local to the computer system 400 can receive the data on the telephone line and use an infrared transmitter to convert the data to an infrared signal. An infrared detector coupled to the bus 402 can receive the data carried in the infrared signal and place the data on the bus 402. The bus 402 carries the data to the main memory 406 from which the processor 404 retrieves and executes the instructions. The instructions received by the main memory 406 may optionally be stored on the storage device 410 either before or after execution by the processor 404.

The computer system 400 also includes a first communication interface 418 coupled to the bus 402. The first communication interface 418 provides two-way data communication coupling the computer system 400 to a network link 420 that is coupled with a local network (domain) 422. The computer system 400 further comprises a second communication interface 424 coupled to the bus 402. The second communication interface 424 is coupled to a network link 426 that is coupled with a shared (VPLS in this example) network (or domain) 428. The second communication interface 424 provides bidirectional communications with the VPLS network 428.

In operation, the processor 404 determines whether packets received from the local network 422 via the network link 420 and the communication interface 418 should be forwarded onto the VPLS network 428 via the communication interface 424 and the network link 426. Similarly, the processor 404 determines whether packets received from the VPLS network 428 via the communication interface 424 and the network link 426 should be forwarded onto the network 422 via the network link 420 and the communication interface 418. For example, the processor 404 may filter control plane and data plane packets received from a redundant router associated with a gateway coupled with the local network 422.

Figure 5:
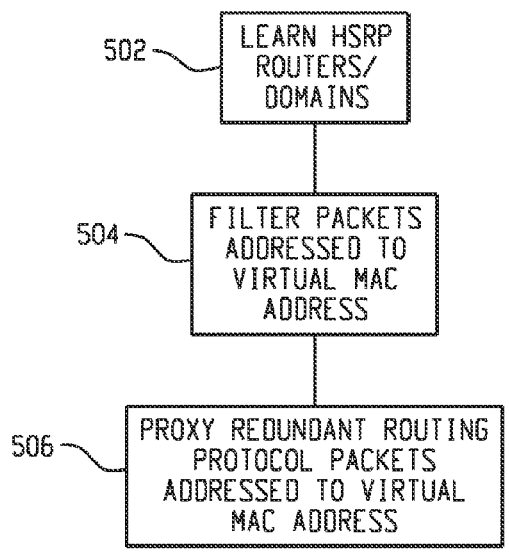
FIG. 5 illustrates an example methodology for supporting gateways with redundant routers coupled with a shared domain.

In view of the foregoing structural and functional features described above, a methodology 500 in accordance with an example embodiment will be better appreciated with reference to FIG. 5. While, for purposes of simplicity of explanation, the methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all of the illustrated features may be required to implement a methodology in accordance with an aspect of an example embodiment. The methodology 500 described herein is suitably adapted to be implemented in hardware, software, or a combination thereof.

At 502, a determination is made whether one or more gateways employing redundant routers are coupled with a local domain. Data representative of gateways employing redundant routers may be forwarded onto a shared (e.g., logically shared) domain such as a VPLS domain. For example, if a gateway with redundant routers is detected in the local domain, data representative of the gateway with redundant routers is transmitted onto the shared domain. In addition, data representative of gateways from other local domains that have routers employing a redundant routing protocol (such as HSRP and/or VRRP) that are coupled with the shared domain may be received from the shared domain.

At 504, predefined redundant routing protocol packets received from the local domain addressed to the shared domain are filtered. For example, if the shared domain is a VPLS domain with a virtual MAC address, predefined packets received from the local domain addressed to the virtual MAC address are filtered.

At 506, a proxy service is provided for redundant routing protocol packets received from a local domain that are addressed to the shared domain. The proxy service may suitably comprise changing the priority level of the packet to a lower (e.g., the lowest) priority level before routing the packet onto the shared domain.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus to restrict bandwidth consumption in a shared domain when the shared domain operatively connects multiple local domains employing the same redundant routing protocol, the apparatus comprising:
    one or more computer processors operatively connected to a memory;
    a first network interface device connecting the apparatus to a first of the multiple local domains, the first local domain having a first set of one or more routers employing a redundant routing protocol;
    a second network interface device connecting the apparatus to the shared domain; and
    virtual bridging logic operatively connected to the first network interface device and the second network interface device, respectively, the virtual bridging logic executable by the one or more computer processors to perform an operation to reduce bandwidth consumption in the shared domain by preventing any given router in the first local domain from becoming an active router for the second local domain based on a priority level of packets employing the redundant routing protocol, the operation comprising:
        snooping ingress packets received via the second network interface device to determine whether a second of the multiple local domains, operatively connected to the shared domain and including a second set of one or more routers, is employing the redundant routing protocol;
        determining that the second local domain is employing the redundant routing protocol;
        subsequent to a first router of the first set of one or more routers becoming an active router for the first local domain based on the priority level of packets employing the redundant routing protocol, providing a proxy service for the first set of one or more routers;
        snooping an egress packet employed by the redundant routing protocol, the packet having a first priority level and being communicated from the first set of one or more routers of the first local domain to the second set of one or more routers of the second local domain; and
        responsive to determining that the second local domain is employing the redundant routing protocol, selectively changing the first priority level of the egress packet to a second priority level lower than the first priority level before routing the egress packet relative to the first local domain.

2. The apparatus of claim 1, wherein the shared domain is associated with a virtual media access control (MAC) address.

3. The apparatus of claim 1, wherein preventing any given router from becoming an active router for the second local domain comprises filtering predefined packets sent by the router on first local domain employing the redundant routing protocol and addressed to the shared domain, wherein the filtering comprises filtering packets received on the first network interface device that are associated with the redundant routing protocol and that are addressed to the virtual media access control (MAC) address.

4. The apparatus of claim 1, wherein the redundant routing protocol is a Hot Standby Router Protocol.

5. The apparatus of claim 1, wherein the redundant routing protocol is a Virtual Router Redundancy Protocol.

6. A non-transitory computer-readable medium containing a program executable to perform an operation to restrict bandwidth consumption in a shared domain when the shared domain operatively connects multiple local domains employing the same redundant routing protocol, the operation comprising:

by one or more computer processors when executing the program, performing a first operation to reduce bandwidth consumption in the shared domain by preventing any given router in a first of the multiple local domains from becoming an active router for a second of the multiple local domains based on a priority level of packets employing a redundant routing protocol, the first local domain having a first set of one or more redundant routers that employ the redundant routing protocol, the second local domain including a second set of one or more routers, the first operation comprising:

perform virtual bridging between the first local domain and the shared domain;

snooping ingress packets to determine whether the second local domain is employing the redundant routing protocol;

determining that the second local domain is employing the redundant routing protocol;

subsequent to a first router of the first set of one or more routers becoming an active router for the first local domain based on the priority level of packets employing the redundant routing protocol, providing a proxy service for the first set of one or more routers;

snooping an egress packet employed by the redundant routing protocol, the packet having a first priority level and being communicated from the first set of one or more redundant routers of the first local domain to the second set of one or more routers of the second local domain; and responsive to determining that the second local domain is employing the redundant routing protocol, selectively changing the first priority level of the egress packet to a second priority level lower than the first priority level before routing the egress packet relative to the first local domain.

7. The non-transitory computer-readable medium of claim 6, wherein the shared domain is associated with a virtual media access control (MAC) address.

8. The non-transitory computer-readable medium of claim 7, wherein preventing any given router from becoming an active router for the second local domain comprises filtering predefined packets sent by the router on first local domain employing the redundant routing protocol and addressed to the shared domain, wherein the filtering comprises filtering packets sent from the local domain that are associated with the redundant routing protocol and that are addressed to the virtual media access control (MAC) address.

9. The non-transitory computer-readable medium of claim 6, wherein the redundant routing protocol is a Hot Standby Router Protocol.

10. The non-transitory computer-readable medium of claim 6, wherein the redundant routing protocol is a Virtual Router Redundancy Protocol.

11. A computer-implemented method to restrict bandwidth consumption in a shared domain when the shared domain operatively connects multiple local domains employing the same redundant routing protocol, the computer-implemented method comprising:

by one or more computer processors, performing an operation to reduce bandwidth consumption in the shared domain by preventing any given router in the first local domain from becoming an active router for the second local domain based on a priority level of packets employing the redundant routing protocol, the operation comprising:

obtaining first data associated with a first set of one or more routers in a first of the multiple local domains operatively connected via the shared domain;

obtaining second data associated with a second set of one or more routers in a second of the multiple local domains;

determining that the first data is representative of the first set of one or more routers employing a redundant routing protocol in the first local domain;

determining that the second data is representative of the second set of one or more routers employing the redundant routing protocol in the second local domain;

subsequent to a first router of the first set of one or more routers becoming an active router for the first local domain based on the priority level of packets employing the redundant routing protocol, providing a proxy service for the first set of one or more routers;

snooping an egress packet employed by the redundant routing protocol, the packet having a first priority level and being communicated from the first set of one or more routers of the first local domain to the second set of one or more routers of the second local domain; and responsive to determining that the second data is representative of the second set of one or more routers employing the redundant routing protocol in the second local domain, selectively changing the first priority level of the egress packet to a second priority level lower than the first priority level before routing the egress packet relative to the first local domain.

12. The computer-implemented method of claim 11, wherein the shared domain is associated with a virtual media access control (MAC) address.

13. The computer-implemented method of claim 11, wherein preventing any given router from becoming an active router for the second local domain comprises filtering predefined packets sent by the router on first local domain employing the redundant routing protocol and addressed to the shared domain, wherein the filtering comprises filtering packets received on the first local domain that are addressed to the virtual media access control (MAC) address.

14. The computer-implemented method of claim 11, wherein the redundant routing protocol is one of a group consisting of a Hot Standby Router Protocol and a Virtual Router Redundancy Protocol.

15. The computer-implemented method of claim 11, wherein preventing any given router from becoming an active router for the second local domain comprises preventing any given router from becoming an active router for the second local domain as a result of the first and second local domains employing the same redundant routing protocol, wherein reducing bandwidth consumption in the shared domain comprises preventing, based on any given router prevented from becoming an active router for the second local domain, network traffic from being forwarded through the shared domain for the active router to then forward.

16. The computer-implemented method of claim 15, wherein preventing any given router from becoming an active router for the second local domain comprises filtering predefined packets sent by the router on first local domain employing the redundant routing protocol and addressed to the shared domain, wherein the redundant routing protocol comprises, in respective instances: (i) Hot Standby Router Protocol (HSRP) and (ii) Virtual Router Redundancy Protocol (VRRP); wherein the predefined packets include, in respective instances: (i) a HSRP Coup message; (ii) a HSRP Resign message; (iii) a VRRP message; (iv) a Gateway Load Balancing Protocol (GLBP) message; and (v) an Address Resolution Protocol (ARP) message.

17. The computer-implemented method of claim 16, wherein the shared domain comprises a virtual private local area network (LAN) service (VPLS) domain, wherein the VPLS domain has a virtual media access control (MAC) address, wherein the VPLS domain provides Ethernet-based, multipoint-to-multipoint communication over one or more Internet Protocol/Multiprotocol Label Switching (IP/MPLS) networks.

18. The computer-implemented method of claim 17, wherein the proxy service is provided by a provider edge router, wherein the provider edge router is operatively connected to the first set of one or more routers in the first local domain via a first network interface, wherein the provider edge router is operatively connected to the shared domain via a second network interface.

19. The computer-implemented method of claim 18, wherein the first network interface is operatively connected to the second network interface via virtual bridging logic, wherein the virtual bridging logic snoops packets received via the second network interface device in order to determine that the first and second local domains employ the same redundant routing protocol, wherein the proxy service is provided by the virtual bridging logic.

20. The computer-implemented method of claim 19, wherein the predefined packets are filtered by the virtual bridging logic, wherein filtering the predefined packets comprises filtering packets received on the first network interface that are associated with the redundant routing protocol and addressed to the virtual MAC address.

* * * * *